United States Patent [19]

Komiya

[11] 4,068,297
[45] Jan. 10, 1978

[54] NUMERICAL CONTROL SYSTEM

[75] Inventor: Hidetsugu Komiya, Hino, Japan

[73] Assignee: Fujitsu Fanuc Limited, Tokyo, Japan

[21] Appl. No.: 696,649

[22] Filed: June 16, 1976

[30] Foreign Application Priority Data

June 21, 1975 Japan .................................. 50-77284

[51] Int. Cl.² .............................................. G05B 19/18
[52] U.S. Cl. ..................................... 364/107; 318/569;
364/200; 364/474
[58] Field of Search ................. 235/151.11; 340/172.5;
318/567, 569, 570, 562

[56] References Cited

U.S. PATENT DOCUMENTS

| 3,519,905 | 7/1970 | Little et al. ................. 235/151.11 X |
| 3,761,893 | 9/1973 | Morley ............................. 340/172.5 |
| 3,849,712 | 11/1974 | Lankford et al. ............ 235/151.11 X |
| 3,875,564 | 4/1975 | Thuruoka et al. ................. 340/172.5 |
| 3,911,347 | 10/1975 | Hartung ...................... 235/151.11 X |

Primary Examiner—Joseph F. Ruggiero
Attorney, Agent, or Firm—Daniel Jay Tick

[57] ABSTRACT

A numerical control system for controlling a machine tool includes a central processing unit, a first memory for storing a first control program, a second memory for storing a second control program, and a third memory for temporarily storing data. Each of the first memory, second memory and third memory is connected to the central processing unit. An interface circuit couples a machine tool to the central processing unit. The interface circuit sends signals to and receives signals from the machine tool. The first control program sends signals to and receives signals from the third memory based on a standard interface with the machine tool. The second control program sends signals to and receives signals from the machine tool via the interface circuit based on an interface corresponding to the machine tool. The second control program also sets a signal from the machine tool in the third memory after converting it to a signal based on a standard interface.

4 Claims, 7 Drawing Figures

NUMERICAL CONTROL SYSTEM

NUMERICAL CONTROL SYSTEM

POWER CONTROL PANEL

NUMERICAL CONTROL SYSTEM

FIG. 7
THIRD MEMORY

| ADDRESS | CONTENT OF MEMORY MRY3 | | | | | | |
|---|---|---|---|---|---|---|---|
| | 1 | 2 | 3 | 4 | 5 | 6 | 7 | 8 |
| 01 | SBK | BDT | DRN | MLK | | | | |
| 02 | HS | | J | MDi | T | | | |
| 03 | +X | +Z | | | -X | -Z | | |
| 04 | HX | HZ | | | | | | |
| 05 | NERS | *SP | RRW | ERS | | | ST | FIN |
| 06 | *+LX | *+LZ | | | *-LX | *-LZ | | |
| 07 | *DCX | *DCZ | | | | | | |
| 08 | M28 | M24 | M22 | M21 | M18 | M14 | M12 | M11 |
| 09 | S28 | S24 | S22 | S21 | S18 | S14 | S12 | S11 |
| 10 | T28 | T24 | T22 | T21 | T18 | T14 | T12 | T11 |
| 11 | MF | SF | TF | | | | | |

NUMERICAL CONTROL SYSTEM

BACKGROUND OF THE INVENTION

The present invention relates to a numerical control system. More particularly, the invention relates to a numerical control system which provides power control of a machine tool with programs.

Usually, a numerical control system consists of a numerical control unit, a machine tool, and a power control panel which is installed between the numerical control unit and the machine tool for power control of the machine tool. Control signals are sent and received between the numerical control unit and the machine tool via the power control panel. The power control panel includes relays.

The miscellaneous function, or M-function, signal designates normal or reverse rotation of the spindle. The speed function, or S-function, signal designates the rotary speed of the spindle. The tool function, or T-function, signal designates tools. These signals are once received by the relays of the power control panel and then converted into specified machine tool control signals according to a sequence previously provided by other relays on the basis of respective signals, and are then supplied to the machine tool.

ON-OFF signals from a limit switch or proximity switch on the machine side, which are sent to the numerical control unit from machine tool, are once received by the relays of the power control panel and are then supplied to the numerical control unit.

In a numerical control system, the hardware for numerical control and power control are perfectly separated. Therefore, for different types of machine tools, machining by numerical control has been provided, corresponding to various types of machine tools, by providing a power control panel suitable for just such machine tool. However, the power control panel of known or existing numerical control systems includes relays, and therefore the power control is likely to create difficulties and troubles and has the disadvantage of difficult maintenance. Furthermore, since a large number of relays are included in the power control panel, a large scale circuit or system must be provided with complicated wiring and at high cost. It would therefore be desirable to provide power control with software instead of with hardware such as relays.

The principal object of the invention is to provide a numerical control system which overcomes the problems and disadvantages of known numerical control systems.

An object of the invention is to provide a numerical control system which utilizes software to provide power control by using control programs instead of hardware utilizing relays.

Another object of the invention is to provide a numerical control system which utilizes software to provide numerical control and power control and the software of the numerical control is separated from the software of the power control.

Still another object of the invention is to provide a numerical control system capable of controlling a machine tool by changing only the software for power control without changing the software for numerical control when the machine tool to be controlled is changed.

Yet another object of the invention is to provide a numerical control system having a single central processing unit and an interruption signal generating circuit and which provides numerical control and power control by controlling the central processing unit on a time division basis via an interruption signal generated by the interruption signal generating circuit.

BRIEF SUMMARY OF THE INVENTION

In accordance with the invention, a numerical control system for controlling a machine tool comprises a central processing unit. A first memory for storing a first control program is connected to the central processing unit. A second memory for storing a second control program is connected to the central processing unit. A third memory for temporarily storing data is connected to the central processing unit. An interface circuit couples a machine tool to the central processing unit. The interface circuit sends signals to and receives signals from the machine tool. The first control program sends signals to and receives signals from the third memory based on a standard interface which is suitable for a standard machine tool. The second control program sends signals to and receives signals from the machine tool via the interface circuit based on an interface corresponding to the machine tool. The second control program also sets a signal from the machine tool in the third memory after converting it to a signal based on a standard interface.

The interface circuit comprises a buffer memory having a first input connected to the central processing unit. The buffer memory has a second input and an output. A driver is connected between the output of the buffer memory and the machine tool and a receiver connected between the second input of the buffer memory and the machine tool.

An interruption signal generating circuit produces an interruption signal. The interruption signal generating circuit is connected to the central processing unit. The interruption signal permits the first and second control programs to use the central processing unit on a time division basis.

The interruption signal generating circuit produces an interruption signal when data transfer from the first control program to the third memory is completed and when the signal from the machine tool changes.

BRIEF DESCRIPTION OF THE DRAWINGS

In order that the invention may be readily carried into effect, it will now be described with reference to the accompanying drawings, wherein:

FIG. 7 is a view of part of the contents of the third memory of FIG. 5.

In the FIGS., the same components are identified by the same reference numerals.

DETAILED DESCRIPTION OF THE INVENTION

Figure 1:
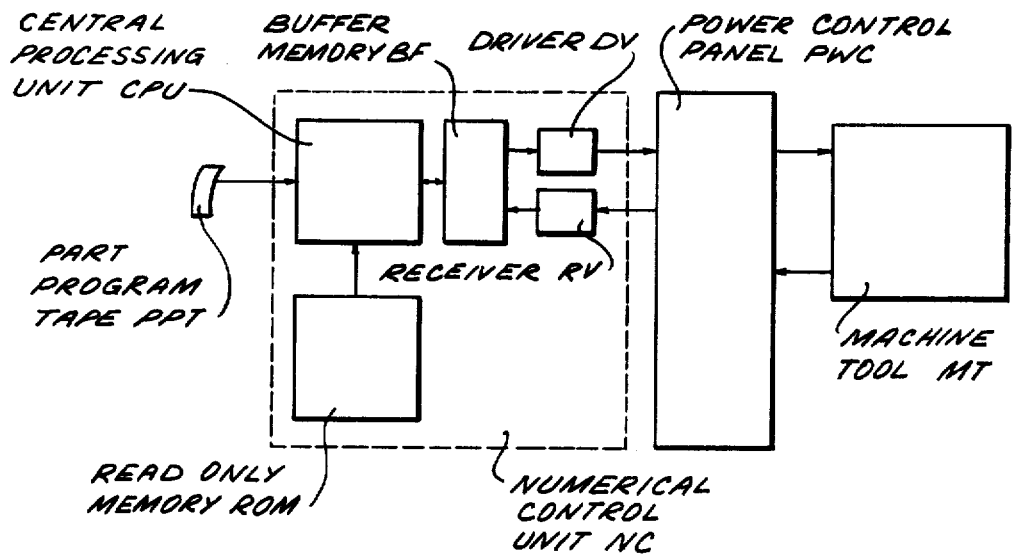
FIG. 1 is a block diagram of a known numerical control system.

FIG. 1 shows a known numerical control system. In FIG. 1, the power control panel PWC includes relays and is provided between the numerical control unit NC and the machine tool MT. The power control panel PWC operates as the interface and controls the machine tool MT by means of the numerical control unit NC. Machining is attempted in accordance with the command of the part program tape PPT. The numerical control unit NC consists of the central processing unit CPU, the read only memory ROM for storing the control program, the buffer memory BF, the driver DV for sending signals, and the receiver RV for receiving signals.

In a numerical control unit of the type of FIG. 1, the hardware for the numerical control and the power control are perfectly separated and the power control panel PWC operating as the interface includes relays. Thus, for different types of machine tools, machining by means of numerical control may be accomplished by utilizing a power control panel PWC suitable for such machine tool. It has the disadvantage that the maintenance of relays and their associated components and circuitry is not easy.

Figure 2:
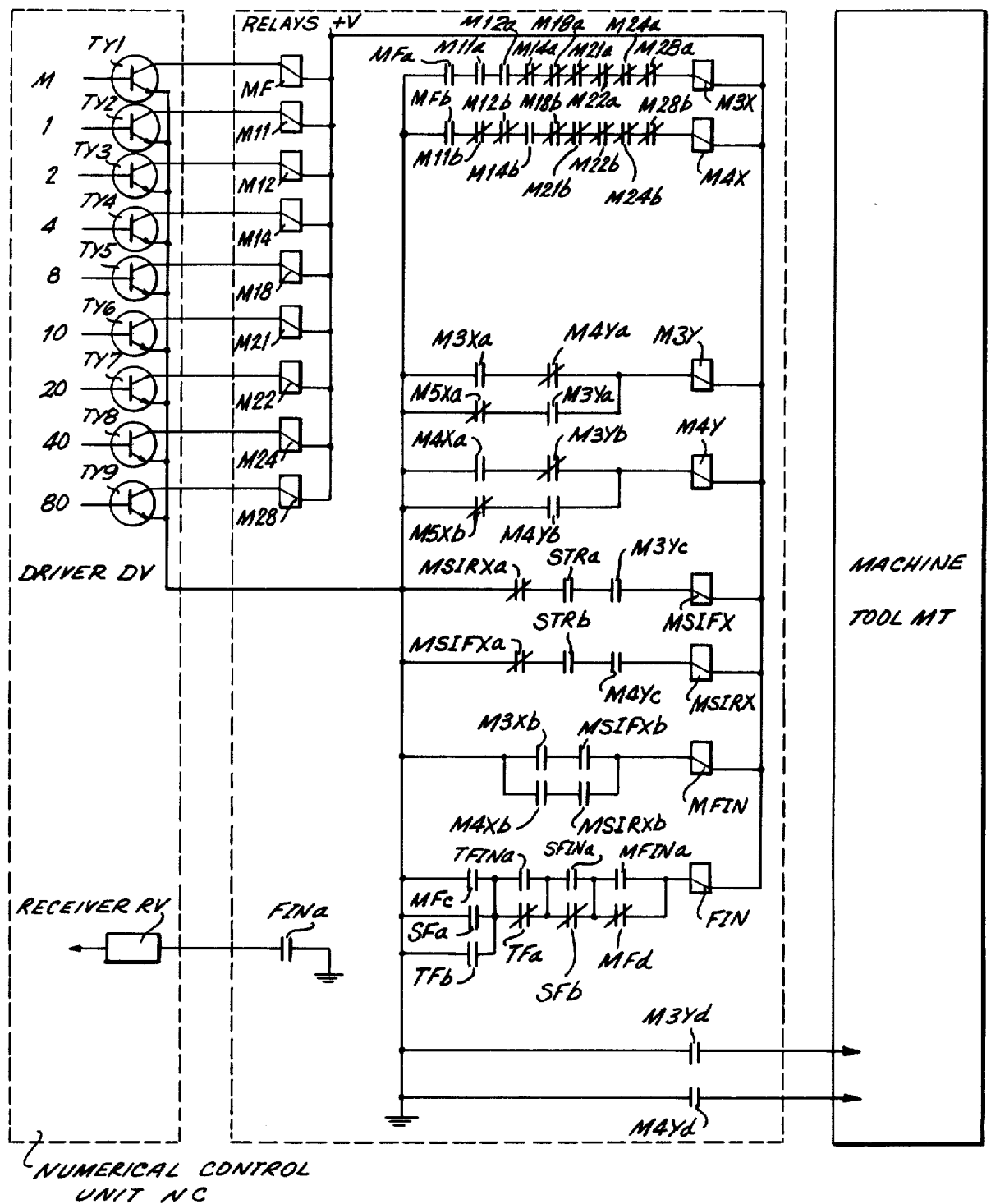
FIG. 2 is a detailed schematic diagram of a known power control panel for normal and reverse rotation of a spindle.

FIG. 2 shows the power control panel for controlling the normal and reverse rotation of the spindle by the numerical control system of FIG. 1. In FIG. 2, the driver DV comprises transistors TR1 to TR9. The power control panel of FIG. 2 includes the receiver RV and a plurality of relays. The relay MF is operated when it receives the signal M of the M-function command from the numerical control unit NC. Relays M11 to M28 are operated when they receive numerals of two digits following the signal M of the M-function, where M11 to M18 represent numerals of the first digit, and M21 to M28 represent numerals of the second digit.

Each numeral is provided in binary decimal code or BCD. The relay M3X is operated when it receives a normal rotation M-function command M03 for the spindle. The relay M4X is operated when it receives a reverse rotation M-function command M04 for the spindle. The relays MSIFX and MSIRX operate during normal and reverse rotation of the spindle, respectively. The relay M3Y provides normal rotation of the spindle and provides a normal rotation signal for the spindle for transmission to the machine tool MT.

The relay M4Y provides a reverse rotation signal for the spindle for transmission to the machine tool MT. The relay MFIN indicates the completion of the M-function. The relay FIN is operated upon completion of control for any M-function, S-function or T-function.

In FIG. 2, a pair of spaced parallel lines, representing the relay contacts, indicate the make contacts of the relay. A pair of spaced parallel lines, representing the relay contacts, with an inclined line intersecting them, indicate the break contacts of the relay. The relay contacts controlled by each relay are indicated by the same reference letters and/or numerals as the relay winding, followed by "a", "b", "c", and so on.

When the M-function command M03 for normal rotation of the spindle is provided by the part program tape, such command is supplied to the base electrode of each transistor Tr1 to Tr9 of the driver DV via the buffer BF. The logic signal which corresponds to the signal M of the M-function command M03 is supplied to the base electrode of transistor Tr1. The BCD code indicating the numeral of the first digit is supplied to the base electrode of the transistors Tr2 to Tr5, respectively. The BCD code indicating the numeral of the second digit is supplied to the base electrodes of the transistors Tr6 to Tr9. Thus, only the transistors Tr1 to Tr3 are switched to their conductive or ON conditions.

When the transistors Tr1, Tr2 and Tr3 are in their conductive conditions, they operate the relays MF, M11 and M12. When the relays MF, M11 and M12 are operated, a current flows through the current path of the relay M3X and said relay operates.

It is assumed that the spindle is in the stop condition when the main spindle normal rotation command 03 is issued. As a result, the relay M4Y, which provides the spindle reverse rotation command to the machine tool, is deenergized, and the relay M3Y, which provides the spindle normal rotation command, is operated or energized. In this condition, a contact signal M3Ya is transmitted to the machine tool, so that the spindle starts normal rotation.

When the spindle starts rotation, the normal rotation relay MSIFX for the spindle operates. The relay MFIN later indicates completion of the M-function and then operates.

When the relay MFIN operates, the relay contacts MFINa close, operating or energizing the relay FIN. Thus, the contact signal FINa is transmitted to the buffer BF via the receiver RV and the numerical control unit NC reads out the next machine program from the part program tape PPT. Subsequently, M-function operation, T-function operation, S-function operation, pulse distribution, and so on, are provided and the machine tool provides machining in accordance with the part program tape PPT.

Figure 3:
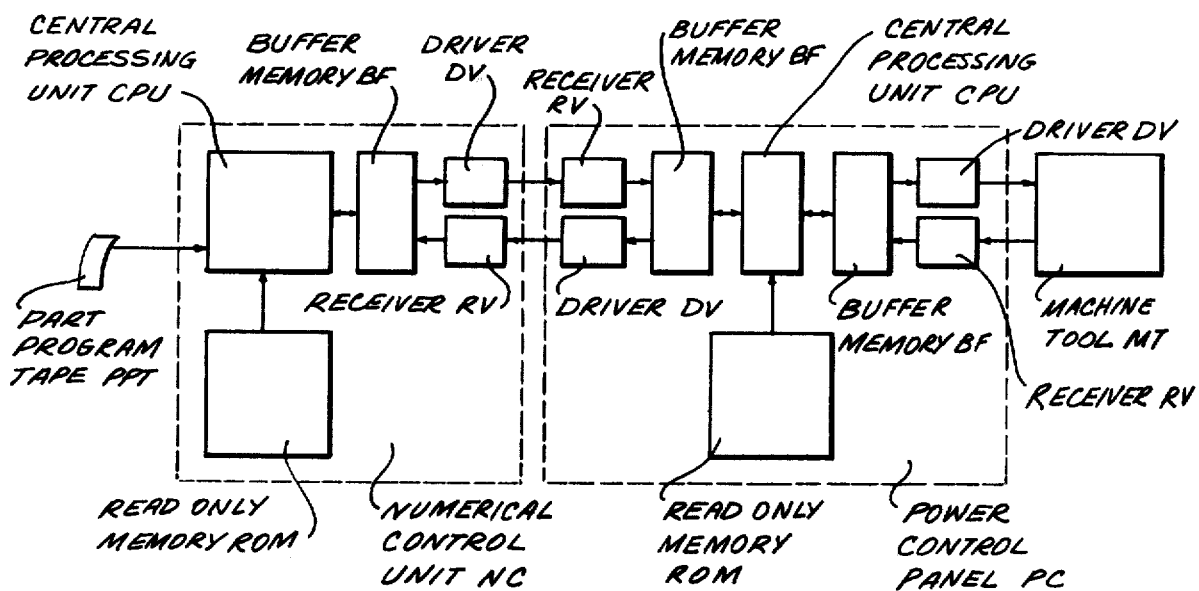
FIG. 3 is a block diagram of a known numerical control system.

FIG. 3 shows a numerical control system in which the program controlled power control panel PC is used as the interface. In FIG. 3, the numerical control program is stored in the memory ROM of the numerical control unit NC and the power control program is stored in the memory ROM of the power control panel PC.

In FIG. 3, the software of the numerical control and the power control are perfectly separated and, at the same time, they can operate in parallel. However, this is somewhat uneconomical, since the central processing unit CPU, the driver DV, the receiver RV and the buffer memory BF are overlapped, as shown in FIG. 3.

Figure 4:
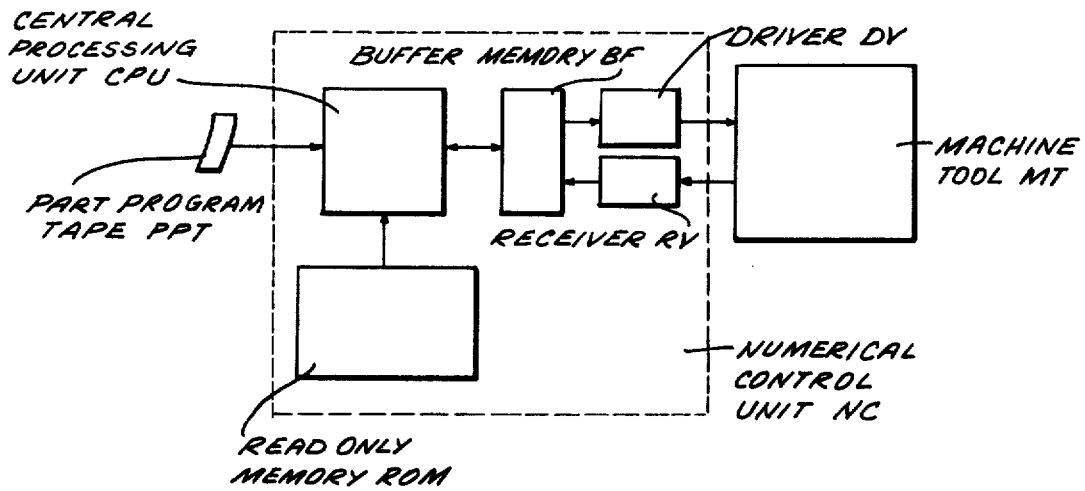
FIG. 4 is a block diagram of a known numerical control system.

FIG. 4 shows a numerical control system which solves the drawback of the system of FIG. 3 and utilizes the overlapped areas of FIG. 3 in common. In the system of FIG. 4, however, the programs for numerical control and power control are stored in the memory ROM and signals for the machine tool MT are handled via the driver DV and the receiver RV. Therefore, when the type of machine tool connected is changed, the numerical control unit NC must be changed. In other words, the hardware of the system of FIG. 4 is simplified compared with that of the system of FIG. 3. However, the system of FIG. 4 has the disadvantage that the software must be designed for each machine tool, since the separation of software for numerical control and power control is very difficult.

Figure 5:
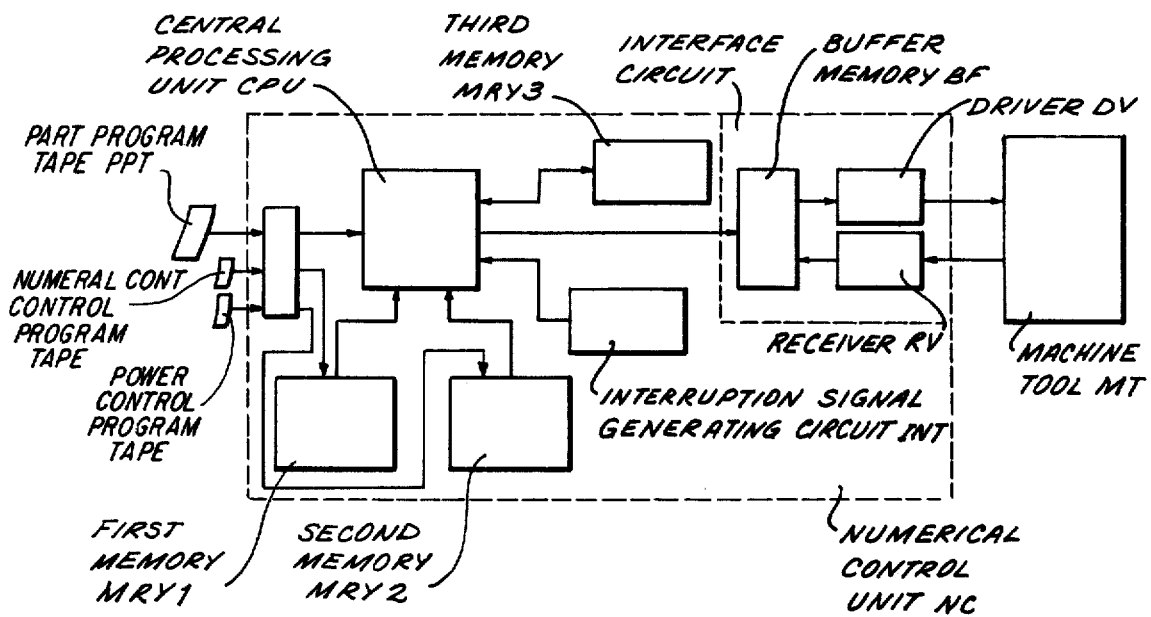
FIG. 5 is a block diagram of an embodiment of the numerical control system of the invention.

FIG. 5 is a block diagram of an embodiment of the numerical control system of the invention. The numerical control unit NC of the system of FIG. 5 comprises a first memory MRY1, a second memory MRY2 and a third memory MRY3. The numerical control unit NC further comprises a buffer memory BF, a driver DV and a receiver RV, which form an interface circuit with the machine tool MT. In addition, an interruption signal generating circuit INT is included in the numerical control unit NC and transmits an interruption signal to the central processing unit CPU according to a status change of the machine tool MT or program. The first control program such as, for example, the numerical control program, is stored in the first memory MRY1. The second control program such as, for example, the power control program, is stored in the second memory MRY2. Each memory may be a read only memory.

The interface circuit has a configuration corresponding to the machine tool MT and performs signal handling and level conversion. The first control program sends signals to or receives signals from the third memory MRY3 based on a standard interface, that is, the standard interfaced utilized when a standard type of machine tool is connected. Therefore, the first control program may be made irrespective of the type of machine tool MT.

The second control program sends signals to or receives signals from the machine tool MT via the interface circuit. A signal from the machine tool MT is once converted to a signal based on the standard interface and is then temporarily stored in the third memory MRY3. Furthermore, the second control program has a function wherein it transfers the standard interface type of signal into the third memory MRY3, and then transmits it to the controlled machine tool via the interface circuit.

The interruption signal generating circuit INT produces an interruption signal, for example, when the transfer of data by the numerical control program from the first control program to the third memory MRY3 is completed, when the signal from the machine tool MT changes and such change is set in the buffer memory BF, and when a clock signal for the timer of the power control program is issued, for example, every 100 milliseconds.

When power control is not provided, and only numerical control is provided, connection to the machine tool MT is via a standard interface, and the sending and receiving of signals to and from the machine tool MT is carried out in compliance with the connection of a standard machine tool. More particularly, the machine tool MT may be controlled by the numerical control program without using the third memory MRY3.

When power control is also provided, the interface is changed to one suitable to the machine tool MT. Therefore, the address and bits of the data line between the central processing unit CPU and the buffer memory BF are assigned to those corresponding to the interface. However, the address and bits of the data line between the central processing unit CPU and the third memory MRY3 are assigned to those when the standard type machine tool is connected. Furthermore, the numerical control program sends and receives signals as if the machine tool were connected to the third memory MRY3.

In addition, a signal representing a status change of a limit switch, or the like, from the machine tool MT is set in the buffer memory BF and then converted to the standard interface by the power control program and further transferred to the third memory MRY3. In other words, data of the numerical control program is stored in the third memory MRY3 by the standard interface and then transmitted to the machine tool MT after being converted by the power control program to an interface just suitable to the machine tool. The signal from the machine tool MT is transferred from the buffer memory BF and stored in the third memory MRY3 after conversion to a standard interface by the power control program. Thus, the operation is accomplished by the numerical control program in accordance with the content of written, stored or recorded data. The power control program corresponds to the machine tool MT and signals are sent to and received by the interface corresponding to the machine tool MT.

The control sequence of the numerical control system of the invention for normal rotation control of the spindle is described with reference to FIGS. 5, 6 and 7.

Figure 6:
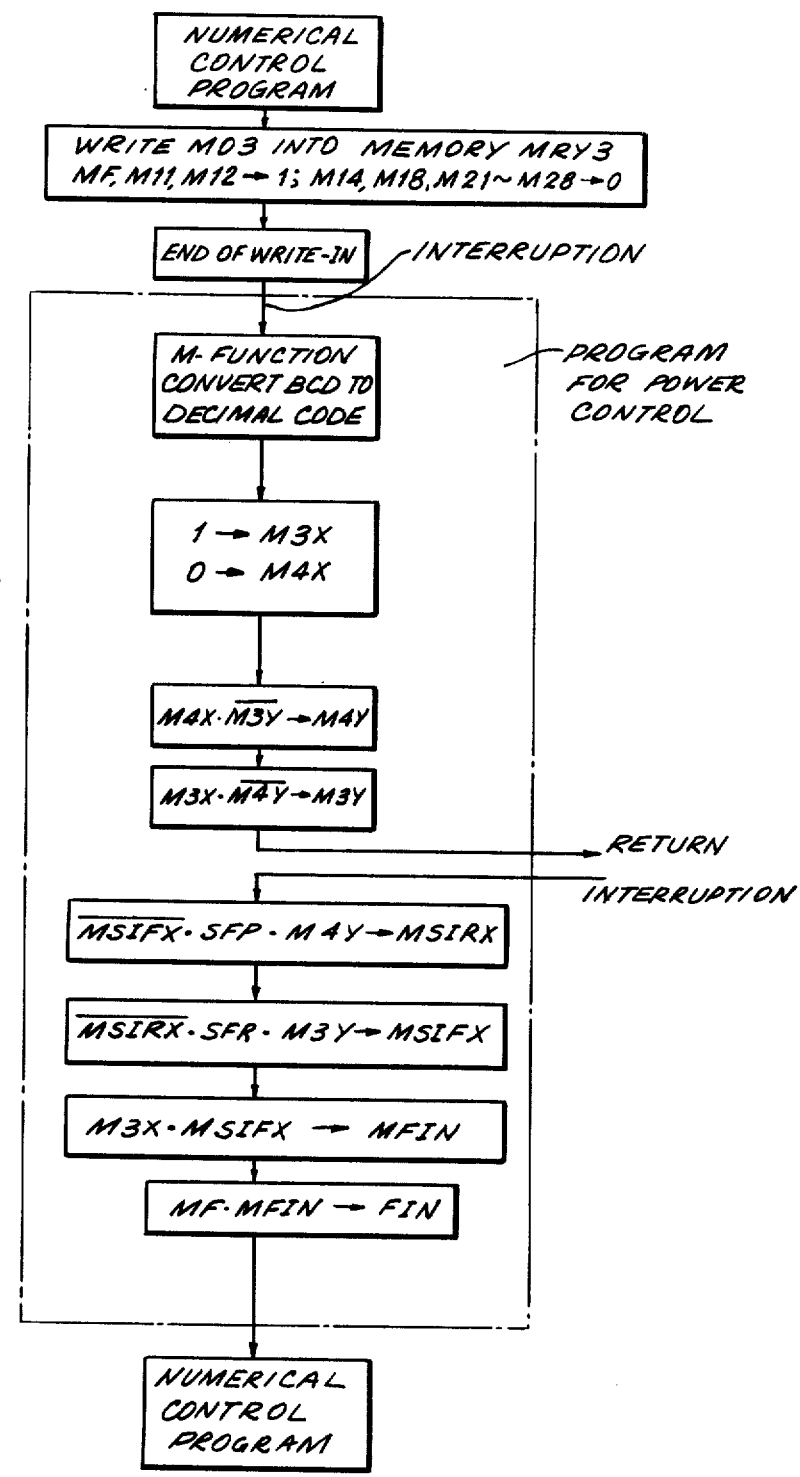
FIG. 6 is a flow chart explaining the operating sequence of the known system of FIGS. 1 and 2 in controlling the rotation of a spindle.

FIG. 6 is a partial flow chart of the power control program for normal rotation control of the spindle. FIG. 7 shows the assignment of control signals to the third memory MRY3 of the numerical control system of the invention. In this case, one address consists of 8 bits.

1. The numerical control program stored in the first memory MRY1 starts and writes, stores or records the normal rotation command MO3 for the spindle in the third memory MRY3. The contents M12 and M11 of the seventh and eighth bits of the address 8 of FIG. 7 and therefore becomes "1", and the contents of MF of the first bit of the address 11 becomes "1".

2. Upon completion of the writing, storage or recording, the interruption signal generating circuit INT produces an interruption signal and thereby starts the power control program stored in the second memory MRY2.

3. The power control program reads the contents of the address 8 of the third memory MRY3 and converts it to a decimal number from the binary BCD. This program successively executes the normal rotation processing sequence of the spindle, which is the same as that established by the relays shown in FIG. 2. That is, the relays M3X andd M4Y are initially set in accordance with the results of the binary to decimal conversion.

"1" → M3X

"0" → M4X

Then, the logic operations of $M4X \cdot \overline{M3Y} \to M4Y$, $M3X \cdot \overline{M4Y} \to M3Y$ are performed with regard to the software. The relay M3Y is set to the buffer register BF, and returns to the condition under the control of the numerical control power after stopping the power control program.

4. The contents of the buffer BF are transferred to the machine tool MT via the driver DV, thereby normally rotating the spindle.

5. Upon completion of the normal rotation of the spindle, the machine tool MT answers back a normal rotation completing signal to the buffer BF via the receiver RV.

"1" → SFR

6. When the contents of the buffer BF change, the interruption signal generating circuit INT again produces an interruption signal in order to start the power control program.

7. The power control program starts the normal rotation processing of the spindle. The same control sequence as that established by the relays of FIG. 2 is started via the software. The control sequence is the following logic operation.

$$\overline{MSIFX}.SFR.M4Y \rightarrow MSIRX$$

$$\overline{MSIRX}.SFR.M3Y \rightarrow MSIFX$$

$$M3X.MSIFX \rightarrow MFIN$$

$$MF.MFIN \rightarrow FIN$$

When the contents of the aforementioned FIN become "1", the logic signal is stored in the eighth bit of the address 5 of the third memory MRY3, thus completing the power control.

8. When the numerical control program recognizes the completion of the normal rotation by FIN becoming "1", it reads out the next machining program from the part program tape PPT and then provides the desirable machining.

As hereinbefore described, the numerical control system of the invention includes the first memory MRY1 for storing the first control program, such as the numerical control program, the second memory MRY2 for storing the second control program, such as the power control program, and the third memory MRY3 for temporary storage of data. As hereinbefore described, the first control program can send signals to and receive signals from the third memory on the basis of a standard interface, the second control program can send signals to and receive from the third memory on the basis of the standard interface, and, furthermore, can send signals to and receive signals from the machine tool on the basis of an interface suitable to the machine tool being controlled.

Furthermore, as hereinbefore described, the first and second control programs may be processed by only one central processing unit. This results in great simplicity of structure and therefore considerable economies in manufacture. The first control program can be perfectly separated from the second control program by means of the first and second memories. Also, the first and second control programs may be used for the control of a machine tool by using the central processing unit on a time division basis. The numerical control system of the invention thus has many advantages, including the features of the known embodiments of FIGS. 3 and 4.

While the invention has been described by means of a specific example and in a specific embodiment, I do not wish to be limited thereto, for obvious modifications will occur to those skilled in the art without departing from the spirit and scope of the invention.

I claim:

1. A numerical control system for controlling a machine tool, said numerical control system comprising
   a central processing unit;
   a first memory for storing a first control program, said first memory being connected to the central processing unit;
   a second memory for storing a second control program, said second memory being connected to the central processing unit;
   a third memory for temporarily storing data, said third memory being connected to the central processing unit; and
   an interface circuit coupling a machine tool to the central processing unit, said interface circuit sending signals to and receiving signals from the machine tool, said first control program sending signals to and receiving signals from the third memory based on a standard interface which is suitable for a standard machine tool, said second control program sending signals to and receiving signals from the machine tool via said interface circuit based on an interface corresponding to the machine tool, and said second control program setting a signal from said machine tool in the third memory after converting it to a signal based on a standard interface.

2. A numerical control system as claimed in claim 1, further comprising an interruption signal generating circuit for producing an interruption signal, said interruption signal generating circuit being connected to the central processing unit, said interruption signal permitting the first and second control programs to use the central processing unit on a time division basis.

3. A numerical control system as claimed in claim 1, wherein the interface circuit comprises a buffer memory having a first input connected to the central processing unit, said buffer memory having a second input and an output, a driver connected between the output of the buffer memory and the machine tool and a receiver connected between the second input of the buffer memory and the machine tool.

4. A numerical control system as claimed in claim 2, wherein the interruption signal generating circuit produces an interruption signal when data transfer from the first control program to the third memory is completed and when the signal from the machine tool changes.

* * * * *